(12) United States Patent
Nahval

(10) Patent No.: US 10,366,043 B2
(45) Date of Patent: Jul. 30, 2019

(54) PERIPHERAL CONTROLLER

(71) Applicant: NXP B.V., Eindhoven (NL)

(72) Inventor: Vinod Kumar Nahval, San Jose, CA (US)

(73) Assignee: NXP B.V., Eindhoven (NL)

( * ) Notice: Subject to any disclaimer, the term of this patent is extended or adjusted under 35 U.S.C. 154(b) by 353 days.

(21) Appl. No.: 15/262,746

(22) Filed: Sep. 12, 2016

(65) Prior Publication Data

US 2017/0109314 A1 Apr. 20, 2017

(30) Foreign Application Priority Data

Oct. 19, 2015 (EP) .................................. 15190439

(51) Int. Cl.
*G06F 13/42* (2006.01)
*G06F 5/06* (2006.01)
*G06F 13/40* (2006.01)

(52) U.S. Cl.
CPC .......... *G06F 13/4291* (2013.01); *G06F 5/065* (2013.01); *G06F 13/4022* (2013.01); *G06F 2205/067* (2013.01)

(58) Field of Classification Search
None
See application file for complete search history.

(56) References Cited

U.S. PATENT DOCUMENTS

| | | | |
|---|---|---|---|
| 5,349,683 A | 9/1994 | Wu et al. | |
| 5,831,929 A * | 11/1998 | Manning | G11C 7/1012 365/189.02 |
| 6,779,125 B1 * | 8/2004 | Haban | H03K 3/356113 327/157 |
| 7,546,481 B2 * | 6/2009 | Hanamori | G06F 1/06 713/500 |
| 7,657,773 B1 * | 2/2010 | Chandra | G06F 1/10 327/295 |
| 8,395,605 B2 * | 3/2013 | Sisto | G09G 5/006 345/204 |
| 2003/0101307 A1 * | 5/2003 | Gemelli | G06F 17/5045 710/305 |
| 2005/0193186 A1 * | 9/2005 | Gazsi | G06F 9/3012 712/228 |
| 2006/0136649 A1 * | 6/2006 | Park | G06F 13/1673 710/307 |

(Continued)

OTHER PUBLICATIONS

Synopsis, Inc., "Synopsis DesignWare DW_apb_i2c Databook", May 2013.

(Continued)

*Primary Examiner* — Henry Tsai
*Assistant Examiner* — Christopher A Bartels

(57) ABSTRACT

A peripheral controller, and method of operation, for half duplex communication between a system and a peripheral, in which a system clock and a peripheral clock are asynchronous, are described. A FIFO includes a FIFO controller and a FIFO memory and has a plurality of inputs. A multiplexer circuit is connected to the plurality of inputs, and is operable by a selection signal to supply either a first group of system and peripheral signals or a second group of system and peripheral signals to the FIFO to operate the FIFO to transmit data from the system to the peripheral or to receive data at the system from the peripheral.

18 Claims, 2 Drawing Sheets

(56) References Cited

U.S. PATENT DOCUMENTS

| | | | |
|---|---|---|---|
| 2008/0008277 A1 | 1/2008 | Griffith | |
| 2009/0177906 A1* | 7/2009 | Paniagua, Jr. | G06F 1/26 713/340 |
| 2011/0208980 A1* | 8/2011 | Brooks | G06F 1/266 713/300 |
| 2012/0314777 A1* | 12/2012 | Zhang | H04N 21/43632 375/240.26 |
| 2013/0057567 A1* | 3/2013 | Frank | G06F 3/1454 345/589 |
| 2014/0063343 A1* | 3/2014 | Goff | G06F 1/10 348/521 |
| 2014/0281057 A1* | 9/2014 | Cohen | G06F 3/061 710/52 |
| 2015/0356045 A1* | 12/2015 | Soffer | G06F 13/4221 710/303 |
| 2016/0337725 A1* | 11/2016 | Graves | H04Q 11/0005 |

OTHER PUBLICATIONS

Extended European Search Report dated Apr. 8, 2016 in EP Application No. 15190439.8.

* cited by examiner

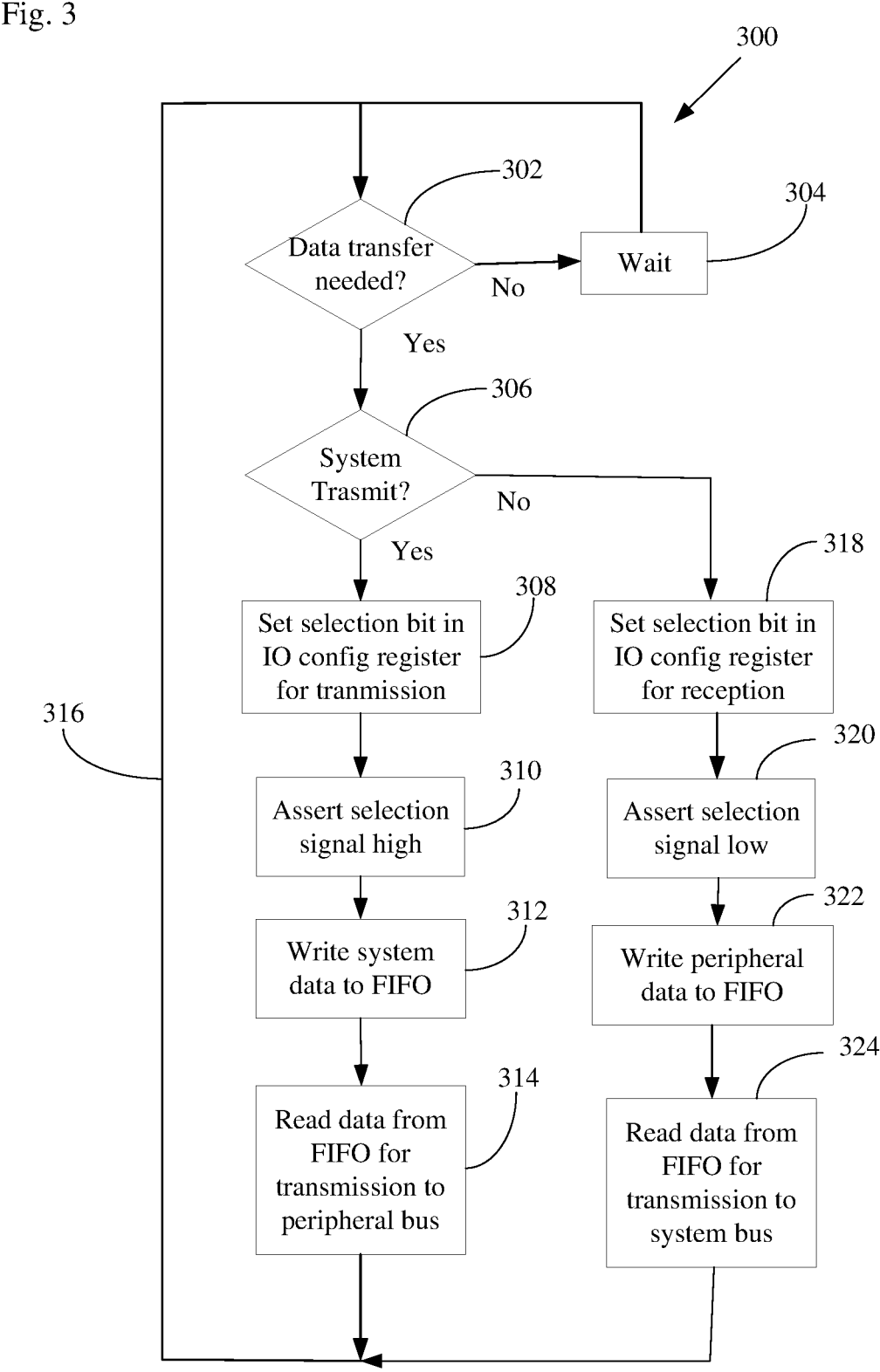

PERIPHERAL CONTROLLER

BACKGROUND

The present specification relates to peripheral controllers and in particular peripheral controllers for half-duplex communication.

RELATED ART

This application claims the priority under 35 U.S.C. § 119 of European Patent application no. 15190439.8, filed on 19 Oct. 2015, the contents of which are incorporated by reference herein.

In the field of data processing and computing, peripherals are various different types of devices that are auxiliary to a main or central data processing device or system. Peripherals often provide some kind of input and/or output function. For example, the data processing system may be a general purpose computer to which various peripheral devices may be attached to communicate and interact with the general purpose computer. For example, input peripherals may include keyboards, mice, graphics tablets, touch screens, pointer devices, microphones, cameras, controllers and similar. Output peripherals may include displays, printers, plotters, storage devices, loud speakers and similar. Some peripherals may provide input and output functions, such as touch screen devices.

Generally speaking, data and/or control commands are passed between the system and the peripheral and some form of communications protocol is used to control the communication of data and/control commands various types of communications protocols may be used, but they may be generally classified as providing either full duplex communication or half duplex communication. A full duplex communication protocol permits transmission and reception at the same time. The telephone is a common example of a communications system permitting duplex communication. A half-duplex communication system permits only one of transmission or reception at any time. Hence, data can either be transmitted or received, but not both at the same time.

An example of a half-duplex communications protocol is the IIC or I²C protocol (the Inter-Integrated Circuit protocol) that provides a serial computer bus, and which may be used, amongst other things, for attaching the integrated circuits of peripherals to processors or microcontrollers of the data processing device. Other half duplex communications protocols that may be used to communicate between the processor or microcontroller of a data processing system and peripheral devices include UART (Universal asynchronous receiver/transmitter) and SPI (Serial Peripheral Interface) which have half-duplex versions.

A peripheral controller may be provided to provide buffering between a system bus, via which a central processing unit, main processor or microcontroller can communicate with other parts of the data processing device, and a peripheral bus to which one or more peripheral devices may be attached. Buffering may be used to accommodate the different rates at which data may be produced by, or consumed by, the system and the peripheral. For example a central processing unit or microcontroller may operate at a much greater speed than an integrated circuit of a peripheral device.

DETAILED DESCRIPTION

The present specification relates to peripheral controllers and methods of operation for half duplex communication between a system and a peripheral.

According to a first aspect of the present disclosure, there is provided a peripheral controller for half duplex communication between a system and a peripheral, in which a system clock and a peripheral clock are asynchronous, the peripheral controller comprising: a FIFO including a FIFO controller and a FIFO memory and having a plurality of inputs; and a multiplexer circuit connected to the plurality of inputs, wherein the multiplexer circuit is operable by a selection signal to supply either a first group of system and peripheral signals or a second group of system and peripheral signals to the FIFO to operate the FIFO to transmit data from the system to the peripheral or to receive data at the system from the peripheral.

In one or more embodiments, the first group of signals may include one, or a plurality, or all of a system clock signal, a system write enable signal, a system data in signal, a peripheral clock signal and a peripheral read enable signal.

In one or more embodiments, the second group of signals may include one, or a plurality, or all of a peripheral clock signal, a peripheral write enable signal, a peripheral data in signal, a system clock signal and a system read enable signal.

In one or more embodiments, the FIFO memory may include a single data output. The peripheral controller may include a peripheral data output path in communication with the single data output and connectable to a peripheral bus and/or a system data output path in communication with the single data output and connectable to a system bus.

In one or more embodiments, the multiplexer circuit may include a plurality of electronically controllable switches each connected to a respective one of the plurality of inputs and each controllable by the selection signal.

In one or more embodiments, the plurality of controllable switches may include a clock signal switch having a system clock input, a peripheral clock input and an output and wherein the output is connected to a write clock input of the FIFO controller and/or a write clock input of the FIFO memory.

In one or more embodiments, the plurality of controllable switches may include a write enable signal switch having a system write enable input, a peripheral write enable input and an output. The output may be connected to a write enable input of the FIFO controller.

In one or more embodiments, the plurality of controllable switches may include a data input signal switch having a system data input, a peripheral data input and an output. The output may be connected to a data input of the FIFO memory. The data input of the FIFO memory may be the only input to the FIFO memory for peripheral data or system data.

In one or more embodiments, the plurality of controllable switches may include a read clock signal switch having a peripheral clock input, a system clock input and an output. The output may be connected to a read clock input of the FIFO controller.

In one or more embodiments, the plurality of controllable switches may include a read enable signal switch having a peripheral read enable input, a system read enable input and an output. The output may be connected to a read enable input of the FIFO controller.

In one or more embodiments, the multiplexer circuit may provide a write interface of the FIFO and/or a read interface of the FIFO. When the selection signal has a first value, the write interface may be connected to a system side and the read interface may be connected to a peripheral side. When the selection signal has a second value, the write interface may be connected to the peripheral side and the read interface may be connected to the system side. The first value may be or correspond to a logic high value. The second value may be or correspond to a logic low value.

In one or more embodiments, the peripheral controller may further include: a peripheral data transmitter having an input in communication with a data output of the FIFO memory and having an output connectable to a peripheral bus; and/or a peripheral data receiver having an output in communication with a data input of the FIFO memory and having an input connectable to a peripheral bus.

In one or more embodiments, the peripheral controller may further include an input/output configuration register in communication with the FIFO and connectable to a system bus. The input/output configuration register may include a location for storing a selection data item and may be arranged to supply the selection signal to the multiplexer circuit. A property of the selection signal may depend on a value of the selection data item.

According to a second aspect of the present disclosure, there is provided a package comprising a lead frame and a semi-conductor integrated circuit, wherein the semi-conductor integrated circuit is configured to provide the peripheral controller of the first aspect.

According to a third aspect of the present disclosure, there is provided an electronic device including: a processor; a system bus connected to the processor; a peripheral bus; a peripheral connected to the peripheral bus; and the peripheral controller according to the first aspect, or a package according to the second aspect, connected to the system bus and the peripheral bus.

According to a fourth aspect of the present disclosure, there is provided a method of operating a peripheral controller to provide half duplex communication between a system bus and a peripheral bus using a FIFO having a multiplexer circuit operable by a selection signal and connected to a plurality of inputs of the FIFO, the multiplexer circuit providing a write interface of the FIFO and a read interface of the FIFO, the method comprising: setting the selection signal to a first value to connect the write interface to a system side and the read interface to a peripheral side to pass data from the system bus to the peripheral bus; and setting the selection signal to a second value to connect the write interface to the peripheral side and the read interface to the system side to pass data from the peripheral bus to the system bus.

Features of the first aspect may also be, or correspond to, counterpart features of the fourth aspect.

Example embodiments of the invention will now be described in detail, by way of example only, and with reference to the accompanying drawings, in which:

FIG. 3 is a process flow chart illustrating a first example embodiment of a method of operating the peripheral controller of FIG. 1.

Similar items in the different Figures share like reference signs unless indicated otherwise.

Figure 1:
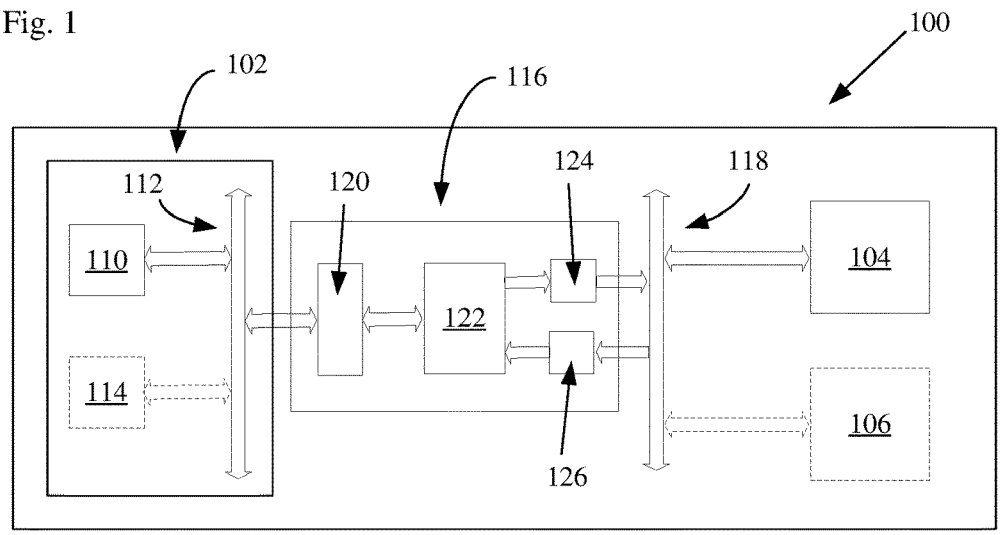
FIG. 1 shows a schematic block diagram of a data processing system in which a peripheral controller may be used.

With reference to FIG. 1 there is shown a schematic block diagram of a data processing apparatus 100. The data processing apparatus 100 includes a main data processing system 102 and at least one peripheral device 104. Further peripheral devices 106 may also be provided, as indicated by dashed lines. The peripheral device, or devices, and the main data processing system may be provided as a single integrated data processing apparatus or device, e.g. a mobile phone, laptop, gaming device, tablet, etc.

The main or central data processing system 102 includes at least a main data processor 110, which may be in the form of a central processing unit or part of a microcontroller. The data processor 110 is connected to a system bus 112 to which other parts of the main data processing system 102 are attached, as illustrated by dashed box 114. For example, the main data processing system may also include various memory and storage devices, various interfaces and similar, as are generally known in the art and which are not shown in FIG. 1 so as not to obscure the disclosure.

A peripheral controller 116 is also provided and is in communication with the system bus 112 and also in communication with a peripheral bus 118 to which the one or more peripheral devices 104, 106 are attached. The peripheral controller 116 provides various interfacing operations to permit half duplex communication between the peripheral devices 104, 106 and the data processing system 102. The data processing system 102 has a system clock signal and the peripheral bus 118 has a peripheral clock signal, and the system clock and peripheral clock are asynchronous. The peripheral controller 116 is configured to implement a half-duplex communication protocol between the main data processing part 102 and the peripherals 104, 106, so that system data can be passed to the peripherals, e.g. for output and/or control, and peripheral data can be passed to the data processing system, e.g. as input and/or control. The peripheral controller may implement various half duplex communication protocols, such as, for example the I²C protocol or UART or SPI.

The peripheral controller 116 includes an IO configuration register 120, a FIFO 122 a data transmitter 124 and a data receiver 126. The peripheral controller provides data buffering to accommodate the differences in rate or speed of the data processing system and peripheral devices by storing data in the FIFO circuitry 122. The IO configuration register 120 may have data written to it by the data processor 110, or using direct memory access (DMA) when present in the data processing system 102, via the system bus 112 to configure the operation of the peripheral controller. The IO configuration register 120 may include Flop or register based memory elements which are used to store configuration and/or control information for the peripheral controller 116. The IO configuration register 120 includes at least one memory element or location for storing a selection data item, the value of which determines a property of a selection signal which is output to the FIFO and used to configure the FIFO 122 to operate in either a transmission mode, in which data is transmitted from the system side to the peripheral side, or a reception mode, in which data is received at the system side from the peripheral side. The selection data item may take various forms. In one embodiment it may be a single bit, and a value of '1' may corresponds to the transmission mode and a value of '0' may correspond to the reception mode.

The data transmitter 124 passes data from the FIFO 122 to the peripheral bus 118 and the data receiver 126 receives data from the peripheral bus 118 and passes the data to the FIFO 122. The data transmitter 124 and data receiver 126 may be implemented as finite state machines and are generally known in the art.

Figure 2:
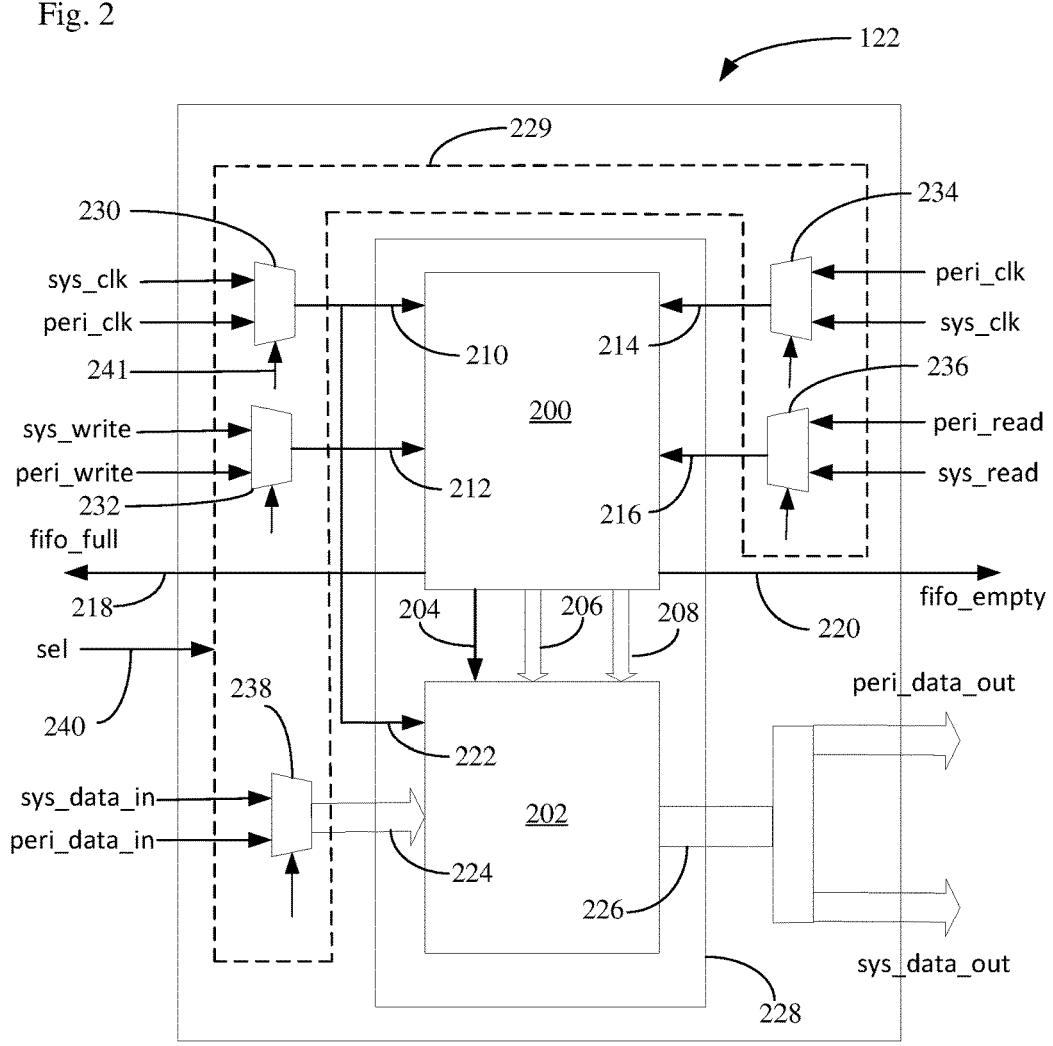
FIG. 2 shows a schematic block diagram of a first example embodiment of an asynchronous FIFO part of the peripheral controller of FIG. 1.

FIG. 2 shows a schematic block diagram of the FIFO part 122 of the peripheral controller 116 in greater detail. The FIFO 122 includes a FIFO controller 200 and FIFO memory or storage 202. The FIFO controller 200 can assert a write enable control signal on line 204 and can supply a write address data item on data connection 206 and a read address data item on data connection 208 to the FIFO memory 202. FIFO controller 200 has a write clock input 210, a write enable input 212, a read clock input 214, a read enable input 216, a FIFO full output 218 and a FIFO empty output 220. The FIFO memory 202 has a write clock input 222, a data input 224 and a data output 226.

The construction and input/output connections of the FIFO controller and FIFO memory 202 are generally similar to a conventional asynchronous FIFO as indicated by box 228. However, FIFO 122 also has a multiplexer circuit, illustrated by dashed line 229, and including a plurality of multiplexers or controllable switches connected to the various inputs of the asynchronous FIFO 228 and which are operable by a common selection signal, "sel", 240 input to the multiplexer circuit 229 and output by the IO configuration register 120 to select to supply different combinations of system side and peripheral side signals to the FIFO 228 depending on whether it is operating in transmission or reception mode. The switches may be implemented in a number of different ways. Depending on the value of the selection data bit, the selection signal takes a first or second value, and the FIFO 228 may obtain input signals from the different inputs of the individual multiplexers.

In greater detail, the multiplexer circuit 229 includes a write clock signal switch 230, a write enable signal switch 232, a read clock signal switch 234, a read enable signal switch 236 and a data input signal switch 238 each operable by the same selection signal, sel, e.g., input 241 to write clock signal switch 230. The write clock signal switch 230 is connected to the write clock input 210 of FIFO controller 200, and also to the write clock input 222 of FIFO memory 220, and has the system clock signal and peripheral clock signal as inputs. The write enable signal switch 232 is connected to the write enable input 212 of FIFO controller 200 and has the system write enable signal and peripheral write enable signal as inputs. The read clock signal switch 234 is connected to the read clock input 214 of FIFO controller 200 and has the peripheral clock signal and system clock signal as inputs. The read enable signal switch 236 is connected to the read enable input 216 of FIFO controller 200 and has the peripheral read enable signal and system read enable signal as inputs. The data in signal switch 238 is connected to the single data input 224 of the FIFO memory 202. The single data output 226 of the FIFO memory communicates with both the system bus 112 and the peripheral bus 118 and provides a system data output signal 242 and a peripheral data output signal 244.

The read interface and write interface of the asynchronous FIFO 228 may be connected to different combinations of system and peripheral signals by the multiplexer circuit 229 depending on the value of the selection signal, e.g. 240, used to operate the switches. For example, the selection signal may be logic high or '1' when operating in a transmitter mode and low or '0' when operating in a receiver mode. 2. In transmission mode, the selection signal is 1, and the write interface of the asynchronous FIFO 228 is connected to the system side and the read interface of FIFO 228 is connected to the peripheral side. Hence, system data can be read from the system bus into FIFO memory 202 and then output to the peripheral bus. In receiver mode, the selection signal is 0, and the read interface of the asynchronous FIFO 228 is connected to the system side and the write interface of the FIFO 228 is connected to peripheral side. Hence, peripheral data can be read from the peripheral bus into FIFO memory 202 and then output to the system bus. In this way, a single asynchronous FIFO 228 can be used for both the transmission and reception paths for half duplex peripheral communication and asynchronous clock signals. This may reduce the gate count used to implement the peripheral controller as a semiconductor integrated circuit.

As noted above, in this described embodiment, the plurality of switches of the multiplexer circuit 229 are controlled by the selection signal 240 which is output by the IO configuration register and the value of which depends on the selection signal data item currently stored in the IO configuration register 120.

FIG. 3 shows a flow chart illustrating a method of operation 300 of the peripheral controller 116 including the asynchronous FIFO 122. At 302 it is determined at the software level whether any data transfer between the system side and peripheral side is required. If not then processing proceeds to 304 and the system waits until some data transfer is determined to be needed at 302. When it is determined at 302 that data transfer is required, then at 306 it is determined at a software level whether the data is to be transferred from the system side to the peripheral, corresponding to the transmission mode of operation, or whether the data is to be transferred from the peripheral side to the system, corresponding to the reception mode of operation. If system transmission is determined at 306, then at 308 the processor 110 writes a '1' to the selection data item address or location in the IO configuration register 120 via the system bus 112. Consequently the selection signal 240 is set to a high value and at 310 the 'high' selection signal is applied to the multiplexer circuit 229 and the write and read interfaces of the FIFO 228 are configured by operating the plurality of switches to allow system data to be transmitted to the peripheral. Specifically, the system clock signal is supplied to the write clock inputs of the FIFO controller and FIFO memory, the system write enable signal is supplied to the write enable input of the FIFO controller, the system data input signal is supplied to the data input of the FIFO memory, the peripheral clock signal is supplied to the read clock input of the FIFIO controller and the peripheral read enable signal is supplied to the read enable input of the FIFO controller. The data output of the FIFO memory 226 is supplied to the peripheral bus and system bus.

Hence, at 312, system data received from the system bus 112 is input to, and buffered by, FIFO memory 202. At 314, the system data is read from the FIFO memory 202 by the data transmitter 124 and passed to the peripheral bus and the system bus. However, the data is only read from the peripheral bus as only the peripheral device is currently expecting to receive data. The fifo_full and fifo_empty signals may be used to manage the buffering of data by the FIFO 228 in a conventional way as is generally known in the art. It will be understood that as used herein, unless indicated otherwise, data is used generally to refer to command, control or addressing data as well as actual content or payload data. After the system data has been read from the FIFO memory and sent to the peripheral bus, processing may return to 302 as indicated by process flow line 316.

If at 306 it is determined that a system receive is next required, then processing proceeds to 318 and processor 110 writes a '0' to the selection data item address or location in the IO configuration register 120 via the system bus 112. Consequently, the selection signal 240 output by the IO configuration register 120 is set to a low value and supplied to the multiplexer circuit 229 at 320 so that the write and read interfaces of the FIFO 122 are configured by operating the plurality of switches to allow peripheral data to be received from the peripheral. Specifically, the peripheral clock signal is supplied to the write clock inputs of the FIFO controller and FIFO memory, the peripheral write enable signal is supplied to the write enable input of the FIFO controller, the peripheral data input signal is supplied to the data input of the FIFO memory, the system clock signal is supplied to the read clock input of the FIFIO controller and the system read enable signal is supplied to the read enable input of the FIFO controller. The data output of the FIFO memory 226 is supplied to the system bus and peripheral bus.

Hence, peripheral data from the peripheral bus 118 is forwarded by the receiver 126 and input to, and buffered by, FIFO memory 202 at 322. At 324, the peripheral data is read from the FIFO memory 202 and passed to the system bus and peripheral bus. As it is the system side that is expecting to receive data, the data is read from the system bus only and is supplied to the appropriate system side destination, e.g. processor 110. Again, the fifo_full and fifo_empty signals may be used to manage the buffering of data by the FIFO 228 in a conventional way, as is generally known in the art, during the transfer of data from the peripheral side to the system side.

Hence, this technique may reduce the gate-count of an integrated circuit implementation of the peripheral controller 116 by sharing a single asynchronous FIFO 128 for half-duplex peripheral communication, as used for example by i2c and similar, and with peripheral and system clocks which are asynchronous.

In some embodiments, the peripheral controller 116 may be provided as a package comprising a lead frame and die comprising a semi-conductor integrated circuit. The semi-conductor integrated circuit may be configured to provide the peripheral controller as illustrated in FIGS. 1 and 2 above.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The instructions and/or flowchart steps in the above Figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

While the disclosure is amenable to various modifications and alternative forms, specifics thereof have been shown by way of example in the drawings and described in detail. It should be understood, however, that other embodiments, beyond the particular embodiments described, are possible as well. All modifications, equivalents, and alternative embodiments falling within the scope of the appended claims are covered as well.

What is claimed:

1. A peripheral controller for half duplex communication between a system and a peripheral, in which a system clock and a peripheral clock are asynchronous, the peripheral controller comprising:
    a FIFO including a FIFO controller and a FIFO memory and having a plurality of inputs; and
    a multiplexer circuit connected to the plurality of inputs, wherein the multiplexer circuit is operable by a selection signal to supply either a first group of system and peripheral signals or a second group of system and peripheral signals to the FIFO to operate the FIFO to transmit data from the system to the peripheral or to receive data at the system from the peripheral;
    wherein the multiplexer circuit includes a plurality of electronically controllable switches each connected to a respective one of the plurality of inputs and each controllable by the selection signal, and
    wherein the plurality of controllable switches includes a clock signal switch having a system clock input, a peripheral clock input and an output and wherein the output is connected to a write clock input of the FIFO controller and a write clock input of the FIFO memory.

2. The peripheral controller as claimed in claim 1, wherein the first group of signals includes a system clock signal, a system write enable signal, a system data in signal, a peripheral clock signal and a peripheral read enable signal.

3. The peripheral controller as claimed in claim 1, wherein the second group of signals includes a peripheral clock signal, a peripheral write enable signal, a peripheral data in signal, a system clock signal and a system read enable signal.

4. The peripheral controller as claimed in claim 1, wherein the FIFO memory includes a single data output and wherein the peripheral controller includes a peripheral data output path in communication with the single data output and connectable to a peripheral bus and a system data output path in communication with the single data output and connectable to a system bus.

5. The peripheral controller as claimed in claim 1, wherein the plurality of controllable switches includes a write enable signal switch having a system write enable input, a peripheral write enable input and an output and wherein the output is connected to a write enable input of the FIFO controller.

6. The peripheral controller as claimed in claim 1, wherein the plurality of controllable switches includes a data input signal switch having a system data input, a peripheral data input and an output and wherein the output is connected to a data input of the FIFO memory, and wherein the data input of the FIFO memory is the only input to the FIFO memory for peripheral data or system data.

7. The peripheral controller as claimed in claim 1, wherein the plurality of controllable switches includes a read clock signal switch having a peripheral clock input, a system clock input and an output and wherein the output is connected to a read clock input of the FIFO controller.

8. The peripheral controller as claimed in claim 1, wherein the plurality of controllable switches includes a read enable signal switch having a peripheral read enable input, a system read enable input and an output and wherein the output is connected to a read enable input of the FIFO controller.

9. The peripheral controller as claimed in claim 1, wherein the multiplexer circuitry provides a write interface of the FIFO and a read interface of the FIFO and wherein when the selection signal has a first value, the write interface is connected to a system side and the read interface is connected to a peripheral side and when the selection signal has a second value, the write interface is connected to the peripheral side and the read interface is connected to the system side.

10. The peripheral controller as claimed in claim 1, and further including an input/output configuration register in communication with the FIFO and connectable to a system bus, wherein the input/output configuration register includes a location for storing a selection data item and is arranged to supply the selection signal to the multiplexer circuit, and wherein a property of the selection signal depends on a value of the selection data item.

11. An electronic device including:
a processor;
a system bus connected to the processor;
a peripheral bus;
a peripheral connected to the peripheral bus; and
a peripheral controller connected to the system bus and the peripheral bus, the peripheral controller for half duplex communication between a system and a peripheral, in which a system clock and a peripheral clock are asynchronous, the peripheral controller comprising:
 a FIFO including a FIFO controller and a FIFO memory and having a plurality of inputs; and
 a multiplexer circuit connected to the plurality of inputs, wherein the multiplexer circuit is operable by a selection signal to supply either a first group of system and peripheral signals or a second group of system and peripheral signals to the FIFO to operate the FIFO to transmit data from the system to the peripheral or to receive data at the system from the peripherals;
 wherein the multiplexer circuit includes a plurality of electronically controllable switches each connected to a respective one of the plurality of inputs and each controllable by the selection signal, and
 wherein the plurality of controllable switches includes a read enable signal switch having a peripheral read enable input, a system read enable input and an output and wherein the output is connected to a read enable input of the FIFO controller.

12. The electronic device as claimed in claim 11, wherein the multiplexer circuitry provides a write interface of the FIFO and a read interface of the FIFO and wherein when the selection signal has a first value, the write interface is connected to a system side and the read interface is connected to a peripheral side and when the selection signal has a second value, the write interface is connected to the peripheral side and the read interface is connected to the system side.

13. The electronic device as claimed in claim 11, and further including an input/output configuration register in communication with the FIFO and connectable to the system bus, wherein the input/output configuration register includes a location for storing a selection data item and is arranged to supply the selection signal to the multiplexer circuit, and wherein a property of the selection signal depends on a value of the selection data item.

14. A method of operating a peripheral controller to provide half duplex communication between a system bus and a peripheral bus using a FIFO having a multiplexer circuit operable by a selection signal and connected to a plurality of inputs of the FIFO, the multiplexer circuit including a plurality of electronically controllable switches each connected to a respective one of the plurality of inputs and each controllable by the selection signal, the multiplexer circuit providing a write interface of the FIFO and a read interface of the FIFO, the method comprising:
 setting the selection signal to a first value to connect the write interface to a system side and the read interface to a peripheral side to pass data from the system bus to the peripheral bus; and
 setting the selection signal to a second value to connect the write interface to the peripheral side and the read interface to the system side to pass data from the peripheral bus to the system bus.

15. The method of operating a peripheral controller as claimed in claim 14, wherein the FIFO memory includes a single data output and wherein the peripheral controller includes a peripheral data output path in communication with the single data output and connectable to the peripheral bus and a system data output path in communication with the single data output and connectable to the system bus.

16. A peripheral controller for half duplex communication between a system and a peripheral, in which a system clock and a peripheral clock are asynchronous, the peripheral controller comprising:
 a FIFO including a FIFO controller and a FIFO memory and having a plurality of inputs; and
 a multiplexer circuit connected to the plurality of inputs, wherein the multiplexer circuit is operable by a selection signal to supply either a first group of system and peripheral signals or a second group of system and peripheral signals to the FIFO to operate the FIFO to transmit data from the system to the peripheral or to receive data at the system from the peripheral;
 wherein the multiplexer circuit includes a plurality of electronically controllable switches each connected to a respective one of the plurality of inputs and each controllable by the selection signal, and
 wherein the plurality of controllable switches includes a write enable signal switch having a system write enable input, a peripheral write enable input and an output and wherein the output is connected to a write enable input of the FIFO controller.

17. A peripheral controller for half duplex communication between a system and a peripheral, in which a system clock and a peripheral clock are asynchronous, the peripheral controller comprising:
 a FIFO including a FIFO controller and a FIFO memory and having a plurality of inputs; and
 a multiplexer circuit connected to the plurality of inputs, wherein the multiplexer circuit is operable by a selection signal to supply either a first group of system and peripheral signals or a second group of system and peripheral signals to the FIFO to operate the FIFO to transmit data from the system to the peripheral or to receive data at the system from the peripheral;
 wherein the multiplexer circuit includes a plurality of electronically controllable switches each connected to a respective one of the plurality of inputs and each controllable by the selection signal, and
 wherein the plurality of controllable switches includes a data input signal switch having a system data input, a peripheral data input and an output and wherein the output is connected to a data input of the FIFO memory, and wherein the data input of the FIFO memory is the only input to the FIFO memory for peripheral data or system data.

18. A peripheral controller for half duplex communication between a system and a peripheral, in which a system clock and a peripheral clock are asynchronous, the peripheral controller comprising:
 a FIFO including a FIFO controller and a FIFO memory and having a plurality of inputs; and
 a multiplexer circuit connected to the plurality of inputs, wherein the multiplexer circuit is operable by a selection signal to supply either a first group of system and peripheral signals or a second group of system and peripheral signals to the FIFO to operate the FIFO to transmit data from the system to the peripheral or to receive data at the system from the peripheral;

wherein the multiplexer circuit includes a plurality of electronically controllable switches each connected to a respective one of the plurality of inputs and each controllable by the selection signal, and wherein the plurality of controllable switches includes a read clock signal switch having a peripheral clock input, a system clock input and an output and wherein the output is connected to a read clock input of the FIFO controller.

\* \* \* \* \*